(12) United States Patent
Murray et al.

(10) Patent No.: US 6,899,616 B1
(45) Date of Patent: May 31, 2005

(54) MASS FLOW GRAIN MONITOR AND METHOD

(75) Inventors: David L. Murray, Wichita, KS (US); Michael D. Case, Norborne, MO (US)

(73) Assignee: ACOO Corporation, Duluth, GA (US)

( * ) Notice: Subject to any disclaimer, the term of this patent is extended or adjusted under 35 U.S.C. 154(b) by 0 days.

(21) Appl. No.: 10/744,273

(22) Filed: Dec. 23, 2003

(51) Int. Cl.⁷ .................. A01D 75/18; A01F 12/16; A01F 21/00
(52) U.S. Cl. ................................. 460/6; 73/861.73
(58) Field of Search ................ 56/10.2 R, 10.2 D; 460/1, 4, 6, 114; 73/861.73, 861.71; 198/312

(56) References Cited

U.S. PATENT DOCUMENTS

| | | | |
|---|---|---|---|
| 4,765,190 A | 8/1988 | Strubbe | |
| 5,194,275 A | 3/1993 | Greer | |
| 5,282,389 A | 2/1994 | Faive et al. | |
| 5,318,475 A * | 6/1994 | Schrock et al. | 460/1 |
| 5,343,761 A | 9/1994 | Myers | |
| 5,561,250 A | 10/1996 | Myers | |
| 5,686,671 A | 11/1997 | Nelson et al. | |
| 5,736,652 A | 4/1998 | Strubbe | |
| 5,952,584 A | 9/1999 | Strubbe | |
| 5,959,218 A | 9/1999 | Strubbe | |
| 5,970,802 A | 10/1999 | Strubbe | |
| 6,003,387 A * | 12/1999 | Larson et al. | 73/861.73 |
| 6,014,903 A | 1/2000 | Strubbe et al. | |
| 6,121,782 A | 9/2000 | Adams et al. | |
| 6,138,518 A | 10/2000 | Strubbe | |
| 6,192,664 B1 | 2/2001 | Missotten et al. | 56/10.2 R |
| 6,272,935 B1 | 8/2001 | Strubbe | 73/861.73 |
| 6,471,032 B2 | 10/2002 | Busschaert et al. | 198/312 |
| 2004/0050175 A1 * | 3/2004 | Missotten et al. | 73/861 |

FOREIGN PATENT DOCUMENTS

| | | | | |
|---|---|---|---|---|
| EP | 0208025 A1 * | 1/1987 | | A01D 41/12 |
| GB | 2364288 A * | 1/2002 | | A01D 41/12 |

* cited by examiner

Primary Examiner—Árpád Fábián Kovács
(74) Attorney, Agent, or Firm—Hovey Williams LLP (57) ABSTRACT

A mass flow grain monitor is located adjacent the upper end of the clean grain elevator assembly of a harvester and includes a load cell having a member that is subject to slight deformation under loads for use in generating an output signal that is proportional to the load. As the grain flow reaches the top of the elevator assembly, its direction is changed such that a centrifugal force is exerted by the moving flow that is proportional to the mass of the grain flow at that instant. Such centrifugal force is directed vertically against the deformable member of the load cell which is itself generally horizontally disposed when the harvester is on level ground so that the entire weight of the deformable member can be treated as tare and zeroed out of the system when it is calibrated with the harvester on level ground. Having the member generally horizontally disposed and measuring the force of the grain vertically causes a significant reduction in the amount of error introduced into the output from the monitor when the harvester encounters upsloping or downsloping hillside conditions.

17 Claims, 6 Drawing Sheets

MASS FLOW GRAIN MONITOR AND METHOD

TECHNICAL FIELD

This invention relates to harvesting equipment, and more particularly, to grain monitors used on combine harvesters and the like for continuously monitoring the clean grain throughput of the machine.

BACKGROUND AND SUMMARY

Grain monitors for combine harvesters are known in the art. It is also known in the art to utilize a load cell as part of such a monitor wherein a Wheatstone bridge or the like is utilized to detect minute deformations of a member of the cell that occur when clean grain from an elevator of the harvester impacts or otherwise exerts a load on the member.

In installations that use load cells, the load member's own weight tends to deform the member to a slight extent, introducing errors into the output data unless the weight (tare) of the member is "zeroed out" during initial calibration of the unit. While such calibration is effective so long as the harvester remains on a level surface, problems arise when the harvest encounters up slopes or downslopes during hillside operations. Some machines have included inclinometers which detect inclination of the harvester and provide appropriate input to computers that process the information to deal with the hillside, but systems of that type can be fairly complex and costly.

The present invention provides a simple yet effective way of dealing with the hillside problem. Rather than measuring the force of the grain flow horizontally after it leaves the clean grain elevator as in some conventional systems, the present invention contemplates measuring the force vertically as it moves around the upper end of the elevator and generates a centrifugal force. The load member of the cell is arranged generally horizontally such that its weight is directly opposite to the generally vertical centrifugal force being generated by the grain flow as it changes directions from vertical to horizontal. This weight can be easily zeroed out as tare during calibration. More importantly, with this arrangement the change in tare during hillside operations is much smaller than in conventional arrangements because the change is proportional to the trigonometric cosine of the hillside angle rather than the sine. Prior art devices which essentially measure the flow force horizontally introduce an error that is proportional to the change of the sine of the hillside angle.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
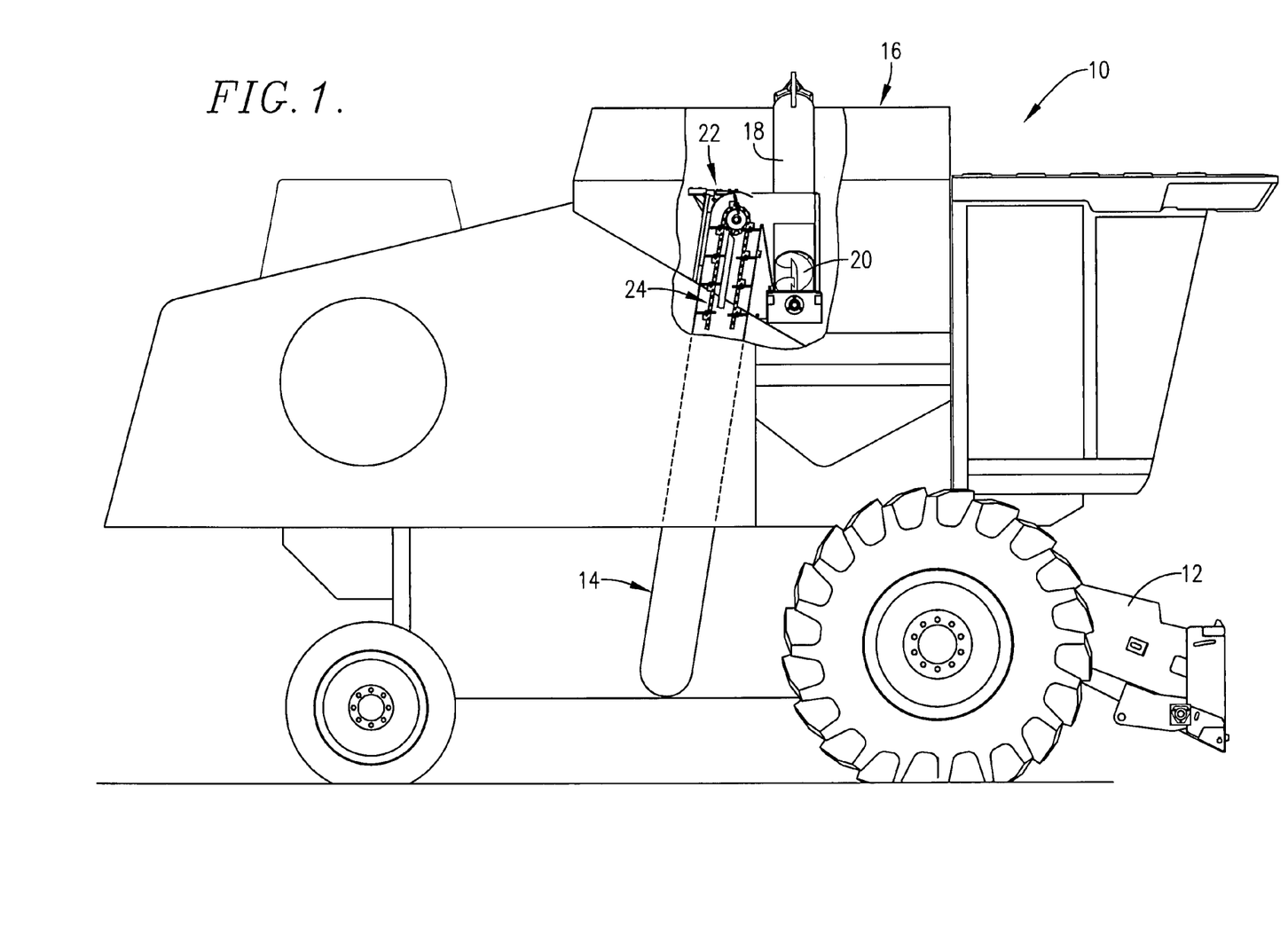
FIG. 1 is a schematic side elevational view of a combine harvester incorporating a mass flow grain monitor in accordance with the principles of the present invention, portions of the exterior of the harvester being broken away to reveal internal details of construction.

The combine harvester 10 in FIG. 1 is illustrated without a harvesting header attached to the lower front end of feeder housing 12. During harvesting operations, however, a header of suitable design is supported at the front end feeder housing 12 and directs harvested materials into the same for subsequent processing by internal threshing and cleaning mechanism of the harvester. Generally speaking, waste products such as straw, stalks, leaves, husks, hulls and chaff exit the machine through the rear thereof while clean grain is directed to a clean grain elevator assembly 14 near the bottom of the machine and elevated toward the top of the machine for subsequent deposit and collection within a clean grain tank 16. At the upper end of the elevator assembly 14, the grain is transferred to a "bubble up" conveyor 18 having an internal auger 20 that delivers the grain upwardly and inwardly toward the center of tank 16. A mass flow grain monitor broadly denoted by the numeral 22 is situated adjacent the upper end of clean grain elevator assembly 14.

Referring to FIGS. 2–5, elevator assembly 14 includes an elevator 24 having an endless conveyor chain element 26 looped around a pair of rotatable guide components at its upper and lower ends in the form of chain sprockets, only the upper sprocket 28 being illustrated in the figures. Conveyor chain 26 includes an upwardly moving run 30 on one side of sprocket 28 and a downwardly moving run 32 on the other side thereof. A generally vertically extending partition 34 is located between runs 30, 32 to help isolate the two areas.

Conveyor chain 26 has a plurality of lift paddles 36 affixed thereto at spaced locations therealong for carrying successive collections of clean grain upwardly into the tank 16 from the bottom of the machine when elevator 24 is operating. Conveyor 24 operates at a relatively high rate of speed so that the collections of grain are moved rapidly up out of the lower region of the machine toward the tank 16.

Figure 2:
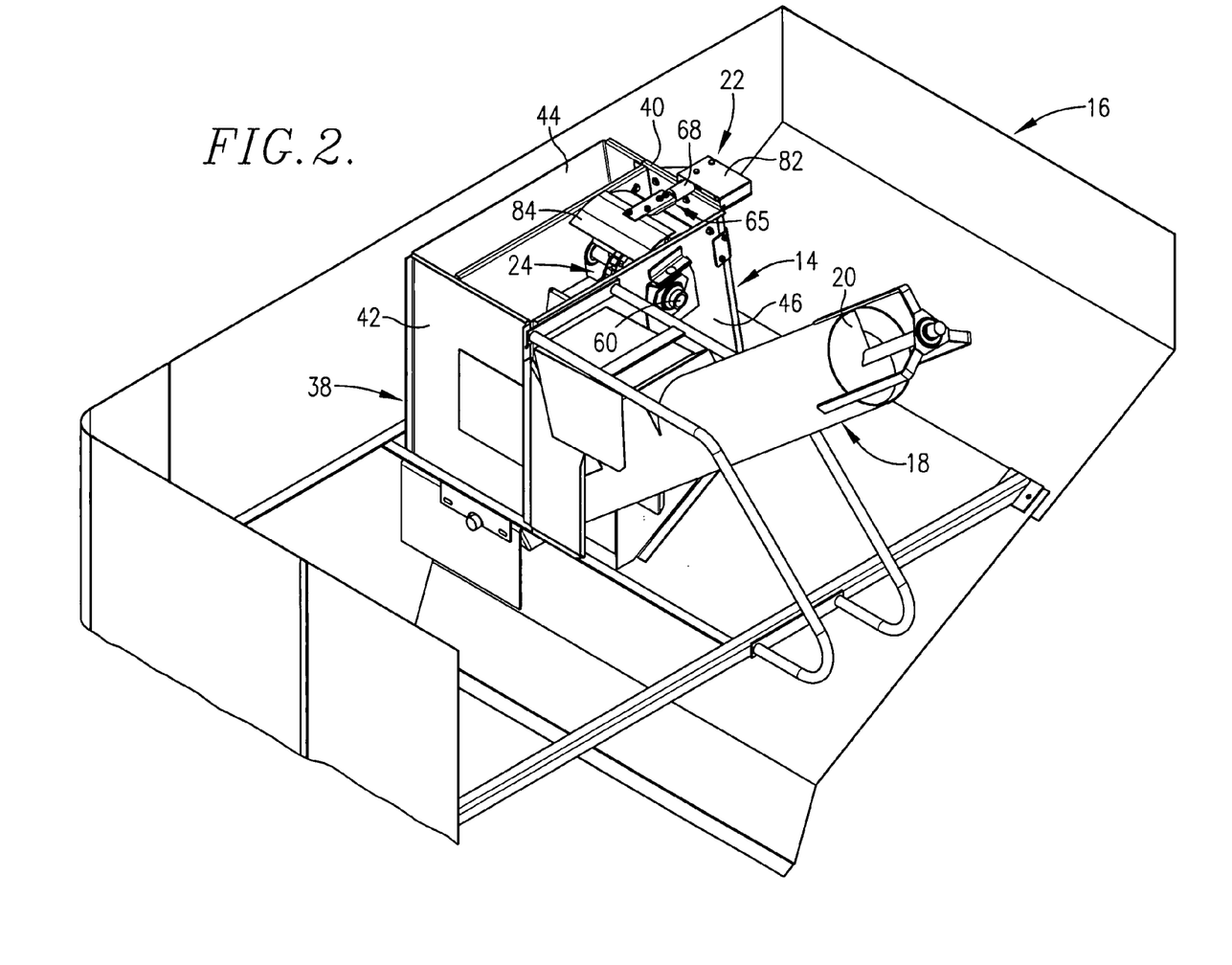
FIG. 2 is an enlarged, fragmentary top perspective view of the clean grain holding tank at the top of the harvester showing in particular the upper end of the clean grain elevator assembly with the cover thereof removed to reveal the grain monitor positioned above the upper end of the clean grain elevator.
Figures 4, 5:
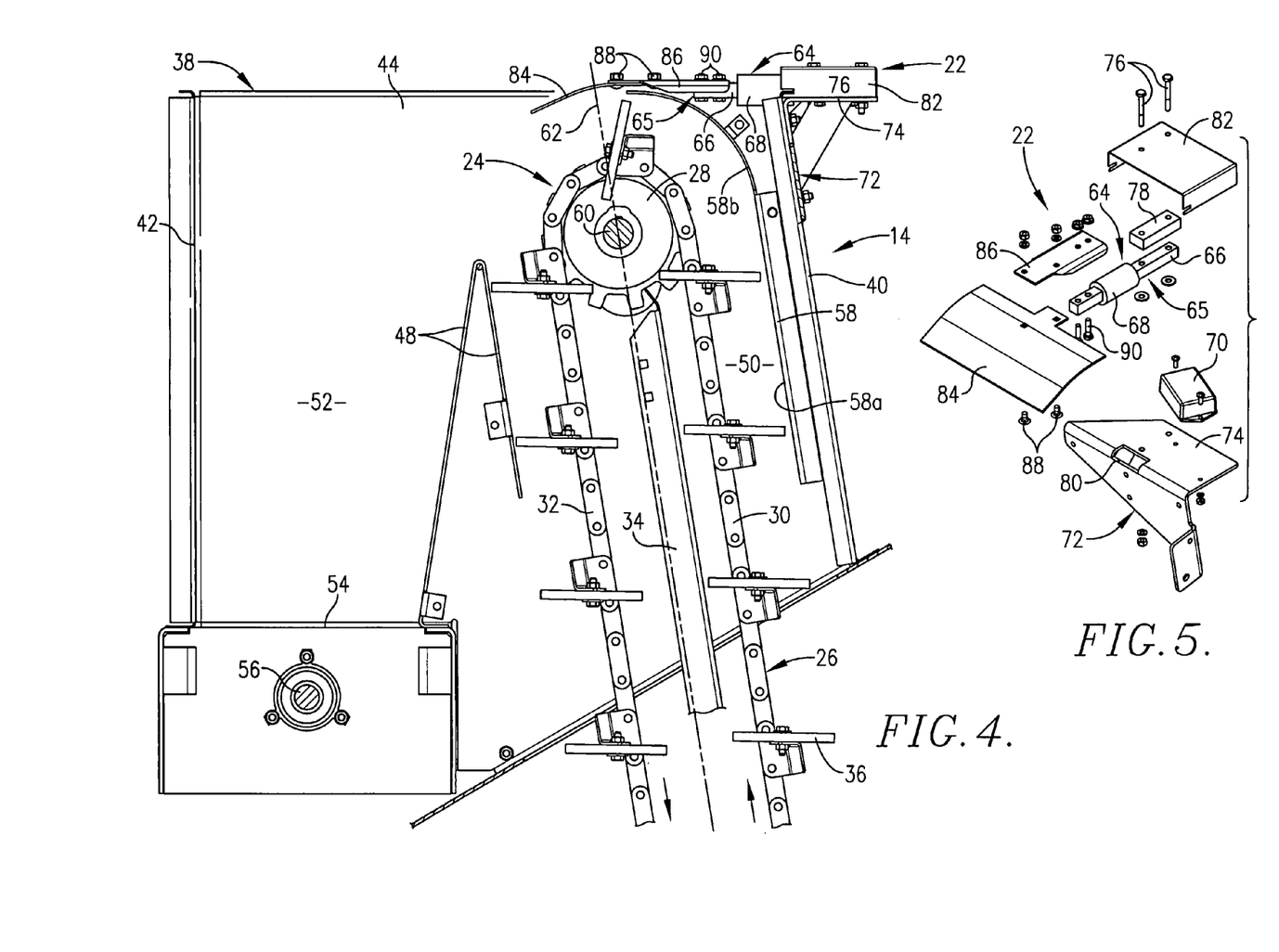
FIG. 4 is a fragmentary side elevational view of the clean grain elevator assembly and associated grain monitor with the top and near sidewall removed.
FIG. 5 is an exploded perspective view of various components of the clean grain monitor and its associated mounting structure.

Elevator assembly 14 also includes various walls and housing structure enclosing elevator 24 including, for example, a housing 38 at the upper end of elevator 24 within tank 16. Among other structure, as shown in FIG. 4, housing 38 includes a rear wall 40, a front wall 42, and a pair of opposite sidewalls 44 and 46 (FIG. 2). A top cover is also provided, although such cover is removed and not visible in the various figures. Internal panels 48 within housing 38 divide the interior of housing 38 into a pair of compartments 50 and 52, the rear compartment 50 being utilized to house the upper end of elevator 24 and the front compartment 52 being utilized to direct grain from elevator 24 down through an opening 54 to the bubble up auger conveyor 18. The shaft 56 of conveyor 18 is illustrated in cross section in FIG. 4 below opening 54.

Figure 3:
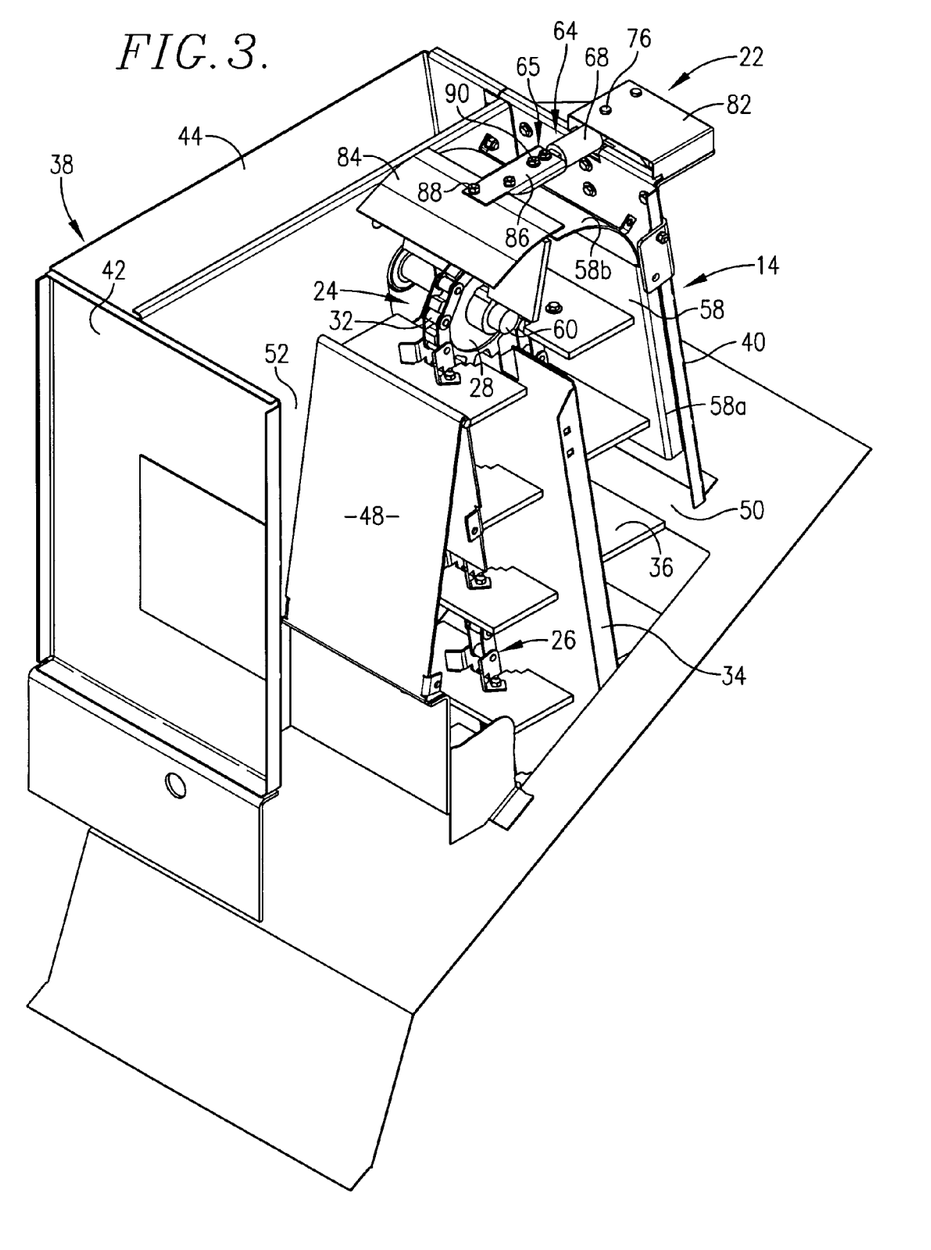
FIG. 3 is a further enlarged top perspective view of the upper end of the clean grain elevator assembly with the top and near sidewall removed to reveal details of construction.

Within compartment 50 is disposed an interior guide wall 58 comprising a further part of conveyor assembly 14. Guide wall 58 is spaced laterally from the upwardly moving run 30 of conveyor chain 26 and includes a lower straight portion 58a and an upper curved portion 58b that curves around sprocket 28 in generally concentric relationship with the axis of rotation thereof defined by shaft 60. A longitudinal axis 62 of elevator 24 intersects the axes of rotation of the sprockets at the upper and lower ends of elevator 24. Curved portion 58b of guide wall 58 commences approximately at the point where the upwardly moving run 30 of chain 26 begins to wrap around sprocket 28 and terminates approximately 90° later just short of the axis 62.

Because of the rapid speed of conveyor chain 26, the clean grain being elevated by elevator 24 essentially produces a flow of crop materials that is moving in a generally vertical, straight line path of travel as it moves upwardly through compartment 50 until reaching the sprocket 28. As conveyor chain 26 moves around sprocket 28, the crop materials are flung to the outside of the paddles 36 and engage curved wall portion 58b, which changes their direction and sends them across the longitudinal axis 62 of the elevator and into chamber 52, where they engage front wall 42 and fall down through opening 54 into the awaiting bubble up conveyor 18. Such change in direction of the material flow by curved wall portion 58b creates a centrifugal force that bears against curved portion 58b as the materials move along the full length thereof. Such centrifugal force is advantageously used by the mass flow grain monitor 22 to provide a continuous measurement of the grain flowing through elevator assembly 14.

Monitor 22, in a preferred embodiment, includes a load cell broadly denoted by the numeral 64 which includes a member 65 that undergoes minute deformation when subjected to a load. In the illustrated embodiment, load member 65 includes a beam or bar 66 received by a "can" 68 that detects deformation of bar 66 under applied loading. Can 68 is electrically connected to a box 70 (FIG. 5) containing electronic components that receive a signal from can 68 proportional to the load applied against bar 66 and appropriately process such signal to provide an output that can be used in a variety of ways such as, for example, displaying information to the operator of harvester 10. Such output may also be used to provide information that can be coordinated with global positioning information to provide yield maps and other useful tools for the operator. By way of example, one load cell that has been found suitable for this purpose is available from Digi-Star LLC of Fort Atkinson, Wis. as part no. 403296.

As illustrated particularly in FIGS. 4 and 5, an inverted generally L-shaped bracket 72 is secured to the exterior of rear wall 40 of housing 38 adjacent its upper extremity and provides a horizontally disposed shelf 74 for supporting load cell 64. Bar 66 of member 65 is secured to horizontal shelf 74 by bolts 76 that pass through a spacer block 78 and the rear of bar 66 so as to maintain member 65 in a generally horizontal attitude when harvester 10 is on a level surface. Bolts 76 and shelf 74 support member 65 in a cantilever manner, with the forward end of bar 66 projecting forwardly beyond shelf 74 and into overhanging relationship with compartment 50 of housing 38. To maintain the horizontal disposition of member 65, the lower cylindrical periphery of can 68 is received within a clearance notch 80 in the leading edge of shelf 74. An inverted generally U-shaped shield 82 protectively overlies the rear end of load bar 66 and spacer block 78 and is secured to shelf 74 using the same bolts 76 that fasten load bar 66 to shelf 74.

Member 65 has a crop flow engaging portion in the nature of a target plate 84 that effectively comprises an extension of load bar 66. Target plate 84 is substantially the same width as lift paddles 36 of elevator 24 such that target plate 84 engages substantially the full width of the crop material flow as it moves around the upper end of elevator 24. As particularly illustrated in FIG. 4, target plate 84 is disposed slightly above and overlaps the terminal end of curved wall portion 58b and projects forwardly therefrom in vertically spaced relation to elevator 24. Target plate 84 is so positioned that the longitudinal axis 62 of elevator 24 intersects plate 84 as illustrated in FIG. 4. A relatively short strap 86 is fastened at its forward end by bolts 88 to target plate 84 and at its rear end by bolts 90 to the free end of load bar 66 for the purpose of attaching target plate 84 to load bar 66.

As noted above, target plate 84 effectively serves as an extended part of load bar 66 to receive the load applied thereto by the centrifugal force of the crop material flow as it moves around the upper end of elevator 24. Target plate 84 is slightly downturned in a fore-and-aft direction so as to maintain approximately the same spacing from conveyor chain 26 as the curved wall portion 58b. Adjacent its free, forward end, target plate 84 is generally straight and flat in a fore-and-aft sense so as to slightly diverge from conveyor chain 26 in a manner to most effectively direct the crop material flow downwardly and forwardly into receiving compartment 52 above outlet 54.

Figure 6A:
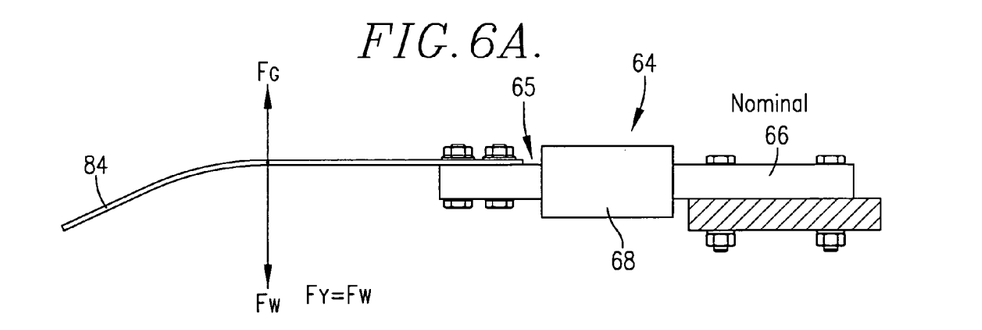
FIG. 6A is a schematic illustration of the clean grain monitor illustrating the manner in which forces act upon the load member during operation when the member is in its nominal, generally horizontal position with the harvester on a level surface.

As illustrated in FIG. 6A, the centrifugal force of the grain flow exerts a vertically upwardly directed force FG against the member 65 at target plate 84 as the grain moves around the upper end of the elevator 24, tending to deform member 65 upwardly. On the other hand, the weight of member 65, including the combined weight of bar 64 and target plate 84, exerts a vertically downward force FW that tends to counteract the grain force FG and deform member 65 downwardly. Thus, the weight of member 65 produces an erroneous output value for the force of the grain flow unless treated as tare and zeroed out by conventional calibration means associated with the monitor 22, such calibration means are described herein due to the conventional nature thereof. When member 65 is perfectly horizontal as illustrated in FIG. 6a, the amount of force FW that must be zeroed out to obtain an accurate value for the force of the grain FG corresponds exactly to the weight FW because FW and FG are in vertically direct opposition to one another.

Figure 6B:
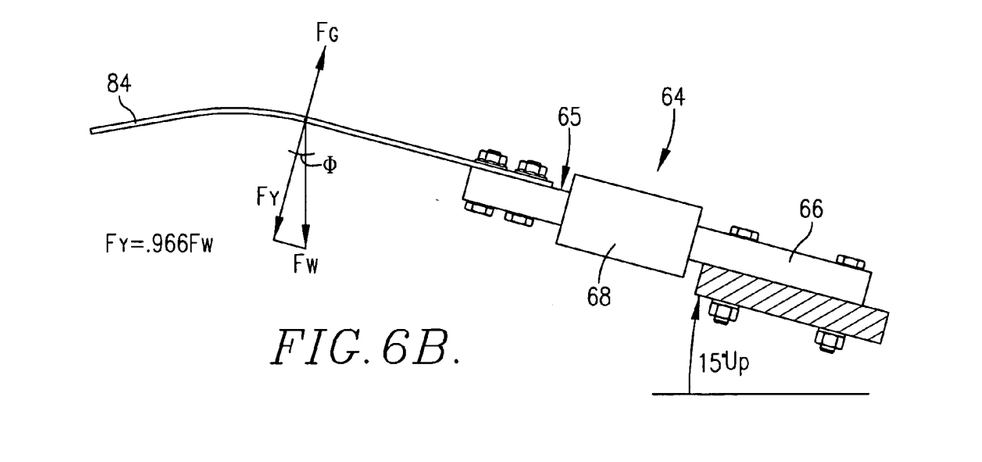
FIG. 6B is a schematic illustration similar to FIG. 6A but showing the application of forces to the load member when the harvester experiences hillside operation with a 15° up slope.
Figure 6C:
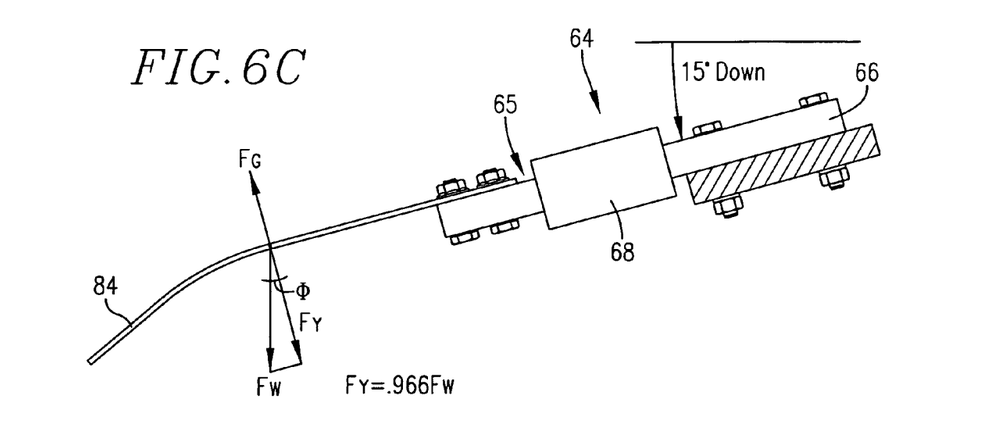
FIG. 6C is a view similar to FIGS. 6A and 6B showing the application of forces to the load member when the harvester undergoes hillside operations with a 15° downslope.

FIG. 6C illustrates, however, that when the combine harvester encounters a downslope during hillside operations, such as for example a 15° downslope, something less than the full weight FW of the member 65 counteracts the force of the grain FG. This component of FW in the direction of force FG is represented in FIG. 6c by the vector "Fy." The value for FY can be mathematically determined as the trigonometric cosine of the angle θ multiplied by force FW. In the illustrated example the value of FY thus equals the cosine of 15° times the force FW, or 0.966 FW. Thus, because the system has been calibrated with the harvester on level ground when the full weight of member 65 is treated as tare, the output of the monitor will be slightly erroneous, i.e., it will have a small error amounting to 3.4% of the weight of the member 65 during the duration of the 15° downslope.

FIG. 6B illustrates the small error that is introduced into the output from monitor 22 when the harvester encounters a 15° up slope hillside condition. Here again, something less than the full weight FW of the member 65 is in direct opposition to the grain force FG. Such portion is represented by the value FY in FIG. 6B and once again can be determined as the cosine of the up slope angle θ times the weight FW. Thus, in this particular example where the up slope angle θ is 15°, FY equals 0.966 FW. Consequently, an output error of 3.4% of the weight of the member 65 will be introduced, but such error is relatively small compared to prior art arrangements as discussed below.

Figures 7A, 7B:
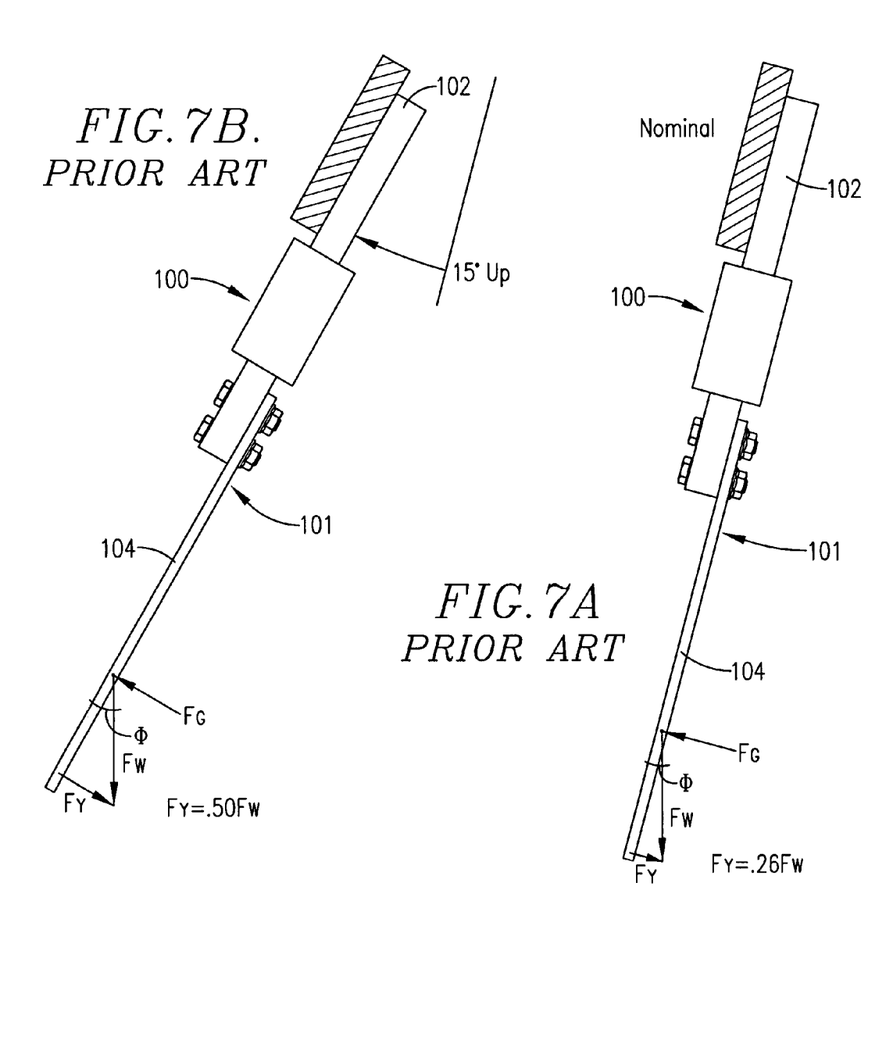
FIG. 7A is a schematic illustration of a prior art monitor wherein the load member is more vertically disposed in the nominal position when the harvester is on a level surface, and showing the application of forces to the load member at that time.
FIG. 7B is an illustration of the prior art monitor showing the application of forces to the load member thereof when the harvester experiences hillside operations with a 15° up slope.

FIG. 7A illustrates a prior art arrangement using a load cell 100 having a load member 101 provided with a load bar 102 and a crop engaging portion 104. Member 101 is not generally horizontally disposed. Instead, it is generally vertically oriented although, in actual practice, it is typically set in the nominal position to reside at an incline of approximately 15° off vertical. The force of the grain FG is normal to the longitudinal axis of member 101, and the weight of member 101 FW is directed vertically downward, as always. In this arrangement, only a small portion of the weight of member 101 is in direct opposition to the force of the grain and needs to be zeroed out during initial calibration of the system when the harvester is on a level surface. The value for this component FY of the weight is determined by multiplying the trigonometric sine of the angle θ times the weight FW. Thus, where θ equals 15°, FY equals 0.26 FW. Consequently, the tare to be zeroed out of the system when the harvester is on level ground is an amount which is equal to 26% of the weight of the member 101. As long as the harvester remains level after the monitoring system has been calibrated, the output from the monitor system should not be affected by the weight of the load member.

Figure 7C:
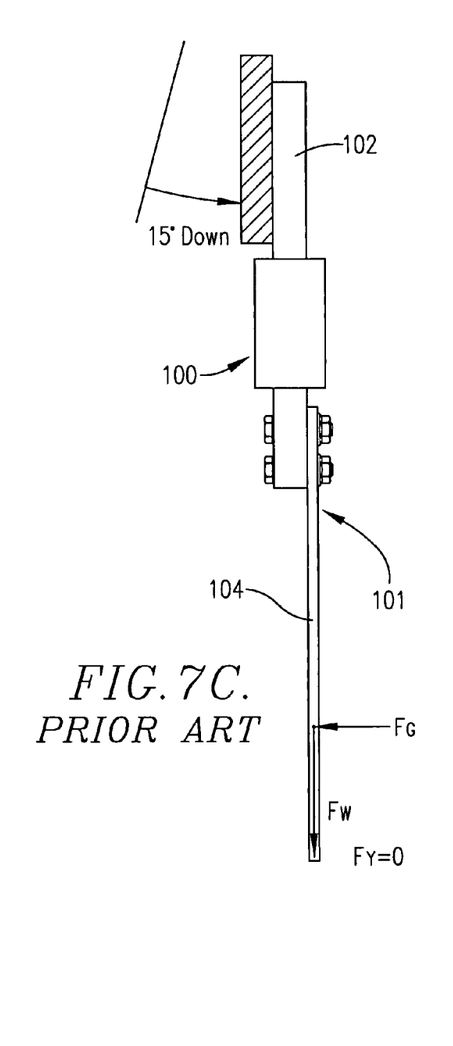
FIG. 7C is a view of the prior art monitor similar to FIGS. 7a and 7b but showing the application of forces to the load member when the harvester undergoes a 15° downslope during hillside operations.

However, if the harvester encounters a 15° downslope as illustrated in FIG. 7C, none of the weight FW of the load member 101 is directly opposed to the force of the grain FG. Thus, with the system calibrated to remove 26% of the weight of the load member as tare, an error having a magnitude of 26% of the weight of the load member is introduced into the system for the duration of the 15° downslope.

A similar error is introduced if the harvester encounters an up slope hillside condition, such as a 15° up slope as illustrated in FIG. 7B. Here the angle θ between the weight FW of the load member 101 and its longitudinal axis is 30°, which means that a larger portion of the weight of the load member should be treated as tare in this condition than in the nominal condition illustrated in FIG. 7A. More particularly, FY in the 15° up slope condition of FIG. 7B is equal to the sine of angle θ times the weight FW, i.e., FY equals 0.50 FW. The difference between FY in FIG. 7B and FY in FIG. 7A is 0.24 FW such that in the 15° up slope condition of FIG. 7B, an error of 24% of the weight of the load member is introduced into the output of the monitor system.

Consequently, it will be seen that in the prior art system where only a small portion of the weight of the load member is treated as tare when the system is initially calibrated, a significant error in output is introduced when the harvester becomes inclined either downwardly or upwardly during hillside operations. At a hillside angle of 15°, such error is on the order of 24–26% of the weight of the load member.

On the other hand, in the present invention where the load member is horizontally disposed and the force of the grain flow is measured vertically, the entire weight of the load member is treated as tare when the system is calibrated. This results in a relatively small error in the output of the monitor system when upsloping or downsloping hillside operations are experienced by the harvester, e.g., on the order of 3.4% of the weight of the load member where the hillside angle is 15°.

The foregoing thus shows that the more nearly horizontal the load member of the load cell is when the harvester is on the level ground and the weight of the load bar is zeroed out as tare, the smaller the error that will be introduced into the output of the monitor system during hillside operations. The present invention thus does not require the load member to be perfectly horizontal, but rather is based upon the discovery that by having the load member generally horizontal and measuring force of the grain flow in a generally vertical attitude, significantly improved results can be obtained. Thus, the term "generally horizontal" within the context of the present invention and the claims which follow, means exactly horizontal and 30° on either side thereof. Similarly, the term "generally vertical" means exactly vertical and 30° on either side thereof.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a crop harvester, the improvement comprising:
    a crop elevator assembly adapted to convey crop materials upwardly from a lower point in the harvester; and
    a mass flow monitor adjacent an upper end of the elevator assembly for measuring the material flow moving past the monitor
    said monitor including a load cell having a member that is subject to deformation under load for use by the load cell in generating a signal proportional to the load,
    said member being supported in such a manner that the weight of the member tends to influence the signal generated by the load cell,
    said elevator assembly being adapted to change the direction of material flow adjacent the upper end of the elevator assembly in such a manner that the material flow exerts a generally vertically directed centrifugal force against a portion of said member as the material flow moves past the member,
    said member being generally horizontally disposed when the harvester is on a level surface.

2. In a crop harvester as claimed in claim 1,
    said portion of the member comprising a crop material engaging plate.

3. In a crop harvester as claimed in claim 2,
said member further comprising an elongated bar supporting said plate.

4. In a crop harvester as claimed in claim 3,
said plate being disposed and configured to be engaged by substantially the full transverse width of the crop material flow moving past the monitor.

5. In a crop harvester as claimed in claim 4,
said plate being slightly downturned at a downstream end thereof.

6. In a crop harvester as claimed in claim 2,
said plate being slightly downturned at a downstream end thereof.

7. In a crop harvester as claimed in claim 6,
said plate being disposed and configured to be engaged by substantially the full transverse width of the crop material flow moving past the monitor.

8. In a crop harvester as claimed in claim 3,
said bar being cantilever mounted.

9. In a crop harvester as claimed in claim 1,
said member being cantilever mounted.

10. In a crop harvester as claimed in claim 1,
said elevator assembly including an elevator having an upper rotatable guide component and an endless conveyor element looped around said upper guide component to present an upwardly moving run on one side of the guide component and a downwardly moving run on the other side of the guide component,
said elevator having a longitudinal axis that intersects the axis of rotation of said upper guide component and said portion of the member.

11. In a crop harvester as claimed in claim 10,
said elevator assembly further including a wall spaced laterally from said upwardly moving run of the elevator,
said wall including a curved portion generally concentric with said axis of rotation of the guide component for effecting said change in direction of the material flow adjacent the upper end of the elevator assembly,
said curved portion commencing on an upstream side of said axis of rotation of the guide component and having a termination adjacent said longitudinal axis of the elevator,
said portion of the member comprising a plate that extends downstream beyond the termination of said wall and is of such a width that the plate engages substantially the full width of the crop material flow.

12. In a crop harvester as claimed in claim 11,
said plate having a slightly downturned free end.

13. In a crop harvester as claimed in claim 1,
said elevator assembly including an elevator having an upper rotatable guide component and an endless conveyor element looped around said upper guide component to present an upwardly moving run on an upstream side of the guide component and a downwardly moving run on a downside of the guide component,
said elevator assembly further including a wall spaced laterally from said upwardly moving run of the elevator,
said wall including a curved portion generally concentric with an axis of rotation of the guide component for effecting said change in direction of the material flow adjacent the upper end of the elevator assembly,
said curved portion having a termination on the upstream side of said axis of rotation of the guide component,
said portion of the member being disposed adjacent said termination of the curved portion of said wall.

14. In a method of measuring crop material flow in a harvester, the improvement comprising:
elevating crop material in an upwardly directed path of travel from a lower point in the harvester to create a material flow;
providing a load cell adjacent the upper end of the path of travel of the material flow,
said load cell including a member that is subject to deformation under load for use by the load cell in generating a signal proportional to the load;
supporting the member of the load cell in such a manner that the weight of the member tends to influence the signal generated by the load cell; and
changing the direction of the material flow adjacent the upper end of its path of travel in a manner to cause the material flow to exert a generally vertically directed centrifugal force against a portion of the member as the material flow moves therepast,
said supporting step including positioning the member in such a manner that the member is generally horizontally disposed when the harvester is on a level surface.

15. In a method as claimed in claim 14,
said supporting step including supporting said member in a cantilever manner.

16. In a method as claimed in claim 15,
said portion of the member comprising a plate,
said method further comprising engaging substantially the full width of the material flow with said plate as the material flow moves past the plate.

17. In a method as claimed in claim 14,
further comprising engaging substantially the full width of the material flow with said portion of the member as the material flow moves past the member.

* * * * *